US010120233B2

(12) United States Patent
Yang et al.

(10) Patent No.: US 10,120,233 B2
(45) Date of Patent: Nov. 6, 2018

(54) OPTICAL MEMBER INCLUDING OPTICAL FIBERS AND MULTI-PANEL DISPLAY DEVICE INCLUDING THE SAME

(71) Applicant: LG Display Co., Ltd., Seoul (KR)

(72) Inventors: Seung-Soo Yang, Paju-si (KR); Bo-Ra Kim, Paju-si (KR); Mi-Hyung Chin, Paju-si (KR); Se-Jin Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/628,549

(22) Filed: Jun. 20, 2017

(65) Prior Publication Data

US 2017/0371201 A1    Dec. 28, 2017

(30) Foreign Application Priority Data

Jun. 28, 2016    (KR) .......................... 10-2016-0081078

(51) Int. Cl.
*G02F 1/1335*    (2006.01)
*G02B 6/06*    (2006.01)
*G09F 9/305*    (2006.01)

(52) U.S. Cl.
CPC .......... *G02F 1/133524* (2013.01); *G02B 6/06* (2013.01); *G09F 9/305* (2013.01); *G09G 2300/026* (2013.01)

(58) Field of Classification Search
CPC ................ G02F 1/133; G02F 1/13336; G02F 1/133362; G02F 1/1335; G02F 1/133524
See application file for complete search history.

(56) References Cited

U.S. PATENT DOCUMENTS 4,139,261 A * 2/1979 Hilsum ................... G02B 6/08
313/494

* cited by examiner

*Primary Examiner* — Thoi Duong
(74) *Attorney, Agent, or Firm* — Fenwick & West LLP

(57) ABSTRACT

An optical member for a multi-panel display device includes a first optical member located on a first display device and including optical fibers; a second optical member located on a second display device neighboring the first display device and including optical fibers; and an optical fiber triangular bar located to overlap a region where the first and second optical members are adjacent to each other, and including optical fibers, wherein each of the first and second optical members includes a chamfer portion corresponding to the optical fiber triangular bar at the region where the first and second optical members are adjacent to each other.

14 Claims, 5 Drawing Sheets

OPTICAL MEMBER INCLUDING OPTICAL FIBERS AND MULTI-PANEL DISPLAY DEVICE INCLUDING THE SAME

CROSS REFERENCE TO RELATED APPLICATIONS

The present application claims the priority benefit of Korean Patent Application No. 10-2016-0081078 filed in Republic of Korea on Jun. 28, 2016, which is hereby incorporated by reference in its entirety for all purposes as if fully set forth herein.

BACKGROUND

Field of the Invention

The present disclosure relates to an optical member including optical fibers and a multi-panel display device including the same, and more particularly, to an optical member including optical fibers and a multi-panel display device, used as a large-sized image display device configured by a plurality of display devices connected to each other, which can achieve an image continuity at connection portions of the display devices and also reduce an impact of joint portions.

Discussion of the Related Art

Generally, flat display devices, such as liquid crystal display devices (LCD), plasma display panel devices (PDP), and organic light emitting diode (OLED) display devices, realize high resolution and have advantages as large-sized display devices.

However, several problems arise when fabricating large size display devices, such as a sharp increase in production cost and a degradation of display quality due to a signal delay.

Accordingly, as an alternative to realizing a large-sized display device using one display device, a multi-panel display device realized by combining a plurality of display devices in a matrix type (so called a tiled type) are commercialized. For example, advertising displays installed on rooftops of buildings, large-sized displays installed at a racecourse or casino, or displays for stock quotations are realized by combining a plurality of display devices in a matrix type.

There exists a region, which a drive IC, a printed circuit, or the like is mounted, at a periphery of a glass substrate to form one display device, and such the region is a non-display region not displaying an image. The non-display region is referred to as a bezel. Accordingly, since the multi-panel display device is fabricated with a plurality of display devices connected, bezel regions are doubly arranged at a connection portion of the display devices, and thus a non-display increases at the connection portion.

FIG. 1 is a view illustrating a plane of a multi-panel display device and a cross-section of a connection portion between panels of the multi-panel display device according to the related art.

The multi-panel display device 100 is fabricated by connecting a plurality of display devices 105, and connection portions between the display devices 105 are formed. Each display device 105 singly constitutes a complete display device, and may be realized using, for example, an LCD, an OLED or the like.

As used herein, the display device 105 is a display device that constitute the multi-panel display device 100, and the display device 105 may be referred to as an individual panel, a panel or the like as the case may be.

The display device 105 may include a display panel 122, a backlight unit (not shown) located below the display panel 122 to supply light to the display panel 122, and a support structure 126 surrounding the display device 105.

In an embodiment where the display panel 122 is a liquid crystal panel, the display panel 122 may include an array substrate that includes gate lines, data lines, pixels defined at crossing portions of the gate and data lines, and a thin film transistor in each pixel, an upper substrate that includes a color filter and/or a black matrix, and a liquid crystal material layer between the array substrate and the upper substrate. A touch window may be additionally located entirely on a top surface of the liquid crystal.

Further, the backlight unit may include a light source module that includes a light source such as a light emitting diode (LED), a holder to fix the light source, and a light source driving circuit, a light guide plate, a reflection plate to reflect a light back toward the liquid crystal panel, and at least one optical film on the light guide plate.

In an embodiment where the display panel 122 is an OLED panel, the display panel 122 may include an array substrate that includes gate lines, data lines, pixels defined at crossing portions of the gate and data lines, and a switching thin film transistor and a driving thin film transistor in each pixel, and an upper protection substrate.

The support structure 126 covering the display panel 122 may include a bottom cover, a guide panel, and the like surrounding and protecting the display panel 122 (and the backlight unit for embodiments using a liquid crystal panel). Furthermore, in embodiments where the display device 105 is an end-use electronic product, the support structure 126 may include a back cover covering the back of this display device 105.

The connection portions 101 of the multi-panel display device 100 correspond to non-display regions, in a lattice shape, of the display devices 105 constituting the multi-panel display device 100. A width of the connection portion 101 between neighboring display devices 105 is two times a width of the non-display region NA of each display device 105. A display region AA of each display device 105 is surrounded by the non-display region.

Since the connection portions 101 are the non-display regions NA, an image is not displayed at the connection portions 101.

The non-display region NA of each display device 105 may be formed by a non-display region of the display panel 122, and a region covered by the backlight unit or covered a top case or front cover of the display device 105.

Accordingly, in the multi-panel display device of FIG. 1, an image disconnection phenomenon happens at the connection portions 101.

SUMMARY

Accordingly, the present disclosure is directed to an optical member including optical fibers and a multi-panel display device including the same that substantially reduces one or more of the problems due to limitations and disadvantages of the related art.

An objective of the present disclosure is to provide an optical member including optical fibers and a multi-panel display device including the same that can achieve an image continuity at connection portions of display devices constituting the multi-panel display device.

Additional features and advantages will be set forth in the description which follows, and in part will be apparent from the description, or may be learned by practice of the present disclosure. These and other advantages will be realized and attained by the structure particularly pointed out in the written description and claims hereof as well as the appended drawings.

To achieve these and other advantages and in accordance with the purpose of the present disclosure, as embodied and broadly described herein, an optical member for a multi-panel display device includes a first optical member located on a first display device and including optical fibers; a second optical member located on a second display device neighboring the first display device and including optical fibers; and an optical fiber triangular bar located to overlap a region where the first and second optical members are adjacent to each other, and including optical fibers, wherein each of the first and second optical members includes a chamfer portion corresponding to the optical fiber triangular bar at the region where the first and second optical members are adjacent to each other.

In another aspect, an optical member for a multi-panel display device includes a first optical member located on a first display device and including optical fibers; a second optical member located on a second display device neighboring the first display device and including optical fibers; and an optical fiber plate on the first and second optical members and connecting the first and second optical members, wherein each of the first and second optical members includes a resin support portion supporting the optical fibers thereof, wherein the optical fiber plate includes straight line type optical fibers and a resin support portion supporting the optical fibers thereof, and wherein a diameter of the optical fiber of the optical fiber plate is equal to or greater than a diameter of the optical fiber of each of the first and second optical members.

In another aspect, a multi-panel display device includes a first display device; a second display device neighboring the first display device; a first optical member located on the first display device and including optical fibers; a second optical member located on the second display device and including optical fibers; and an optical fiber triangular bar located to overlap a region where the first and second optical members are adjacent to each other, and including optical fibers, wherein each of the first and second optical members includes a chamfer portion corresponding to the optical fiber triangular bar at the region where the first and second optical members are adjacent to each other.

In another aspect, a multi-panel display device includes a first display device; a second display device neighboring the first display device; a first optical member located on the first display device and including optical fibers; a second optical member located on the second display device and including optical fibers; and an optical fiber plate on the first and second optical members and connecting the first and second optical members, wherein each of the first and second optical members includes a resin support portion supporting the optical fibers thereof, wherein the optical fiber plate includes straight line type optical fibers and a resin support portion supporting the optical fibers thereof, and wherein a diameter of the optical fiber of the optical fiber plate is equal to or greater than a diameter of the optical fiber of each of the first and second optical members.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Reference will now be made in detail to various embodiments, examples of which are illustrated in the accompanying drawings. The same reference numbers may be used throughout the drawings to refer to the same or like parts.

Figure 1:
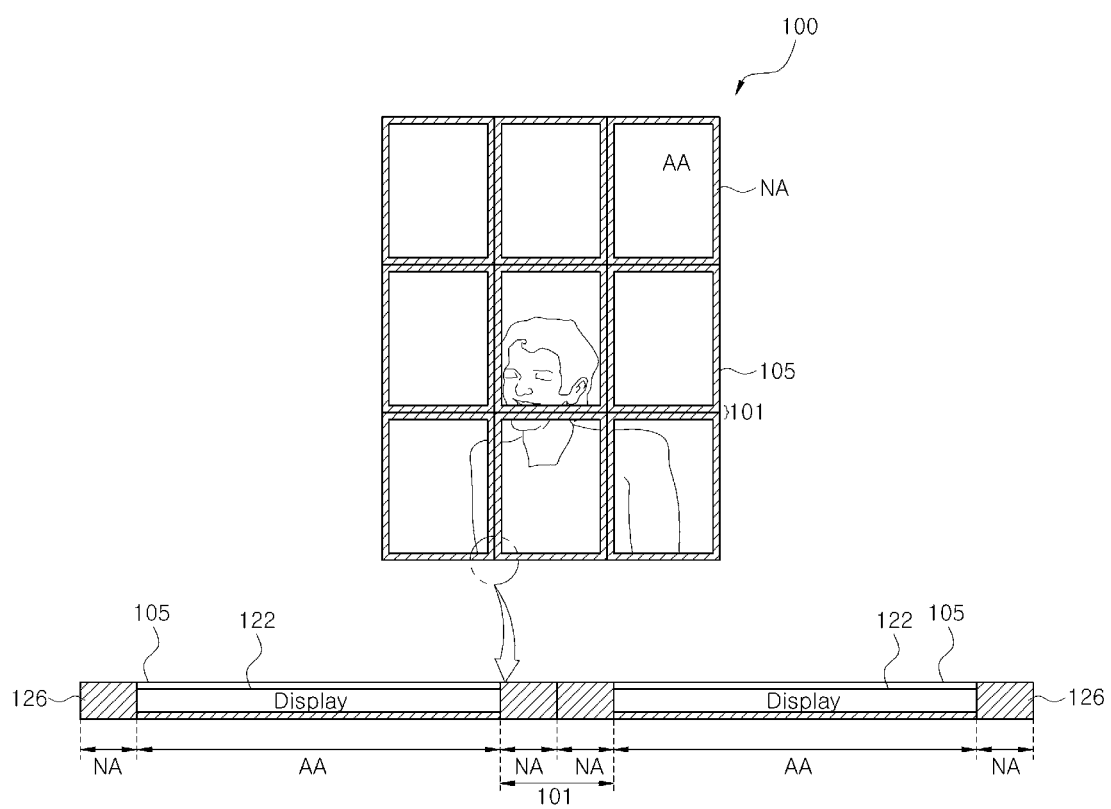
FIG. 1 is a view illustrating a plane of a multi-panel display device and a cross-section of a connection portion between panels of the multi-panel display device according to the related art.
Figure 2:
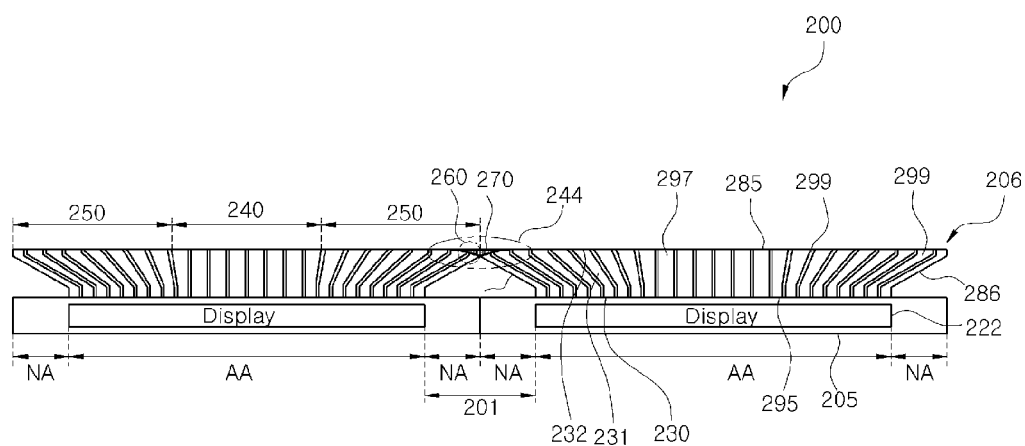
FIG. 2 is a cross-sectional view illustrating a portion of a multi-panel display device including an entire-surface type optical member according to a first embodiment.
Figure 3:
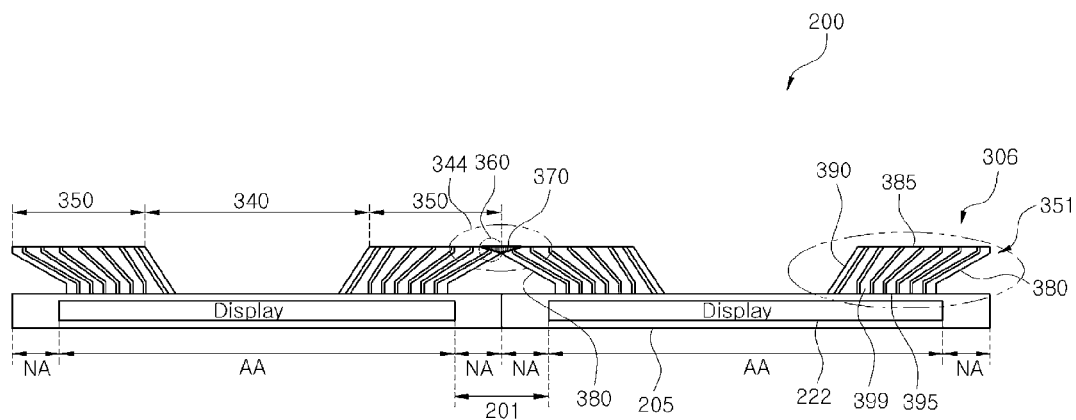
FIG. 3 is a cross-sectional view illustrating a portion of a multi-panel display device including a frame type optical member according to the first embodiment.

FIGS. 2 and 3 are cross-sectional views illustrating portions of multi-panel display devices according to a first embodiment.

Each display device 105 of the first embodiment includes a display region AA at a center displaying an image, and a non-display region NA surrounding the display region AA and not displaying an image. Accordingly, since connection portions 201 of the multi-panel display device 200 fabricated by connecting a plurality of display devices 205 have the non-display regions NA of the display devices 205, a phenomenon of not displaying image at the connection portions 201 happens.

However, in this embodiment, to obtain an image continuity at the connection portions 201, optical members (206 of FIG. 2 or 306 of FIG. 3) are located on each display device 205 to refract or enlarge light paths of images produced by the display devices 205 and thus images can be displayed at the connection portions 201. Thus, the image disconnection phenomenon can be reduced.

The optical member of this embodiment is categorized into an entire-surface type optical member and a frame type optical member, which are explained in detail below.

FIG. 2 shows a portion of a multi-panel display device including an entire-surface type optical member according to the first embodiment.

The entire-surface type optical member 206 corresponding to substantially an entire surface of the display device 205 includes a first region 240 of a non-enlarging region that corresponds to a predetermined region at a center of the display device 205, and a second region 250 of an enlarging region that corresponds to a peripheral portion, including the non-display region NA, of the display device 205. First optical fibers 297 are located at the first region 240, and second optical fibers 299 are located at the second region 250 and have a structure different from the first optical fibers 297.

The first optical fiber 297 is a straight line type optical fiber in which an input portion 230 has the same size as an output portion 232. This first optical fiber 297 functions to transfer an image of a corresponding pixel without enlarging, into a top portion of the optical member 206. The second optical fiber 299 is a refracting type optical fiber in which an output portion 232 has a size greater than that of an input portion 230. This second optical fiber 299 functions to enlarge and transfer an image of a corresponding pixel into the top portion of the optical member 206. The pixel and optical fibers are explained in detail later.

A shape of the entire-surface type optical member 206 is described in detail as follows. The entire-surface type optical member 206 includes a top surface portion 285 which an image produced by the display panel 222 is output through, a bottom surface portion 295 which is opposite to the top surface portion 285 and faces the display panel 222, and side surfaces 286 which connect the top surface portion 285 and the bottom surface portion 295 at both sides.

A part of the optical fibers 297 and 299 of the entire-surface type optical member 206 are located on the non-display region NA of the display device 205 or the connection portion 201 and thus outputs an image from the pixels of the display region AA over the connection portion 201. Accordingly, an image disconnection phenomenon at the connection portion 201 can be reduced.

FIG. 3 shows a portion of a multi-panel display device including a frame type optical member according to the first embodiment.

The frame type optical member 306 includes an optically transmissive center region 340 and a frame region 350 located at a periphery of the center region 340.

The center region 340 is a region that intactly transmits an image of the center portion of the display region AA of the display device 205. The frame region 350 surrounding the center region 340 is a region where a frame portion 351 is located. The frame region 350 transfers an image of the peripheral pixels of the display region AA, through optical fibers 399 therein, into the connection portion 201.

The frame portion 351 includes a bottom surface portion 395 which covers a portion of the periphery of the display region AA of the display device 205, a top surface portion 385 which an image produced by the pixels of the display region AA at the periphery of the display panel 222 is output through, and an inner inclined side surface 390 and an outer side surface 380 which connect the top surface portion 385 and the bottom surface portion 395.

The optical fibers 399 totally refracts lights input from the corresponding pixels and outputs the lights over the frame type optical member 306, i.e., the top surface portion 385. Accordingly, an image disconnection phenomenon at the connection portion 201 can be reduced.

When joining the optical members (206 of FIG. 2 or 306 of FIG. 3) over the connection portion 201 of the neighboring display devices 205, by a collision of the optical members 206 or 306 touching each other at a collision-expected portion (244 of FIG. 2 or 344 of FIG. 3), the optical members 206 or 306 may be cracked, and in this case, an image disconnection phenomenon at the connection portion 201 may happen.

Accordingly, in this embodiment, a chamfer portion (260 of FIG. 2 or 360 of FIG. 3) and an optical fiber triangular bar (270 of FIG. 2 or 370 of FIG. 3) are employed at the optical members 206 or 306 touching each other. Accordingly, the crack of the optical members 206 and 306 due to the collision at the collision-expected portion 244 or 344 can be prevented, and an image continuity at the connection portion 201 can be achieved.

Figure 4:
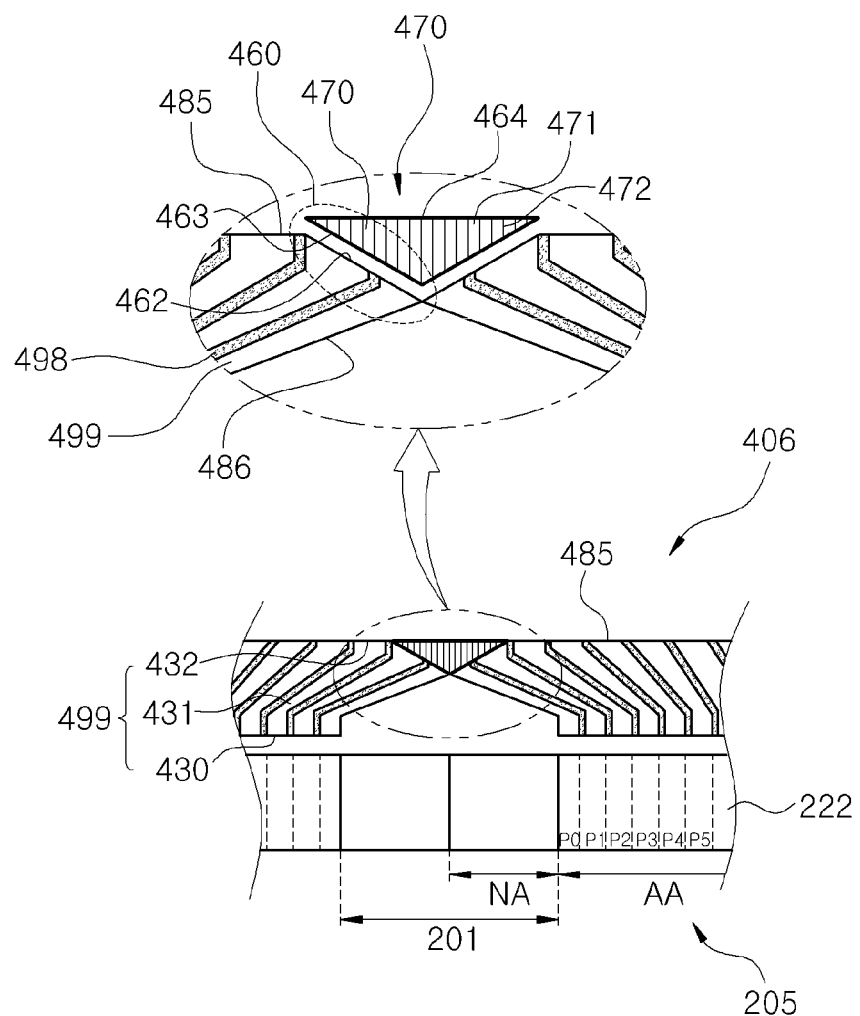
FIG. 4 is a cross-sectional view enlarging a portion of an optical member according to the first embodiment.

FIG. 4 is a cross-sectional view enlarging a portion of an optical member according to the first embodiment.

A chamfer portion 460 is formed at each of the edges of optical members 406 touching each other. An optical triangular bar 470 is located on chamfer surfaces 462 forming the chamfer portions 460. The optical triangular bar 470 may be located overlapping an adjacent region of the neighboring optical members 406 where the chamfer portions 460 are formed.

The chamfer portion 460 has a shape such that an edge, at which a first top surface portion 485 and a side surface 486 of the optical member 406 are connected, is cut at a predetermined angle. The optical fiber triangular bar 470 is located at a region where the chamfer portions 460 of the neighboring optical members 406 are arranged.

Each chamfer portion 460 has the chamfer surface 462, and the chamfer surface 462 is a surface that connects the first top surface portion 485 and the side surface 486 at a predetermined angle. The optical fiber triangular bar 470 includes a plurality of a straight line type optical fibers 471 and a support portion 472 supporting the optical fibers 471. The optical fiber triangular bar 470 has an inclined surface 463, which contacts each of the chamfer surfaces 462 of the neighboring optical members 406, and a second top surface portion 464 which connects the first top surface portions 485 of the neighboring optical members 406.

The shapes of the chamfer portion 460 and the optical fiber triangular bar 470 of FIG. 4 are shown by way of example, and other shapes may be used.

The optical member 406 on each display device 205 includes a plurality of optical fibers 499 and a resin support portion 498 that is interposed between the optical fibers 499 to combine and support the optical fibers 499. The optical member 406 is entirely optically transparent.

The resin support portion 498 may be made of a thermosetting resin or UV curable resin. By arranging the optical fibers 499, interposing a resin between the optical fibers 499 and curing the resin with heat or UV, the optical member 406 including the optical fibers 499 can be fabricated.

The optical fibers 499 and the resin support portion 498 are made of a transparent material. For example, polymethyl methacrylate (PMMA), polycarbonate (PC), poly ether sulfone (PES), polypropylene (PP), methacrylate styrene (MS), polyethylene terephthalate (PET), acryl, silica, glass, or the like may be used.

Each optical fiber 499 includes an input portion 430 at a bottom, an output portion 432 at a top, and a transmission portion 431 connecting the input portion 430 and the output portion 432.

The optical member 406 is located with the input portion 430 of each optical fiber 499 facing the display panel 222, and the display panel 222 includes a plurality of pixels P0 to P5.

Each optical fiber 499 is located with each input portion 430 thereof corresponding to each of the pixel regions P0 to P5 of the display panel 222 thus receives a light from the corresponding pixel region through the input portion 430, totally reflects the light in the transmission portion 431, and outputs the light to the output portion 432. Accordingly, an image produced by the pixels P0 to P5 of the display panel 222 is displayed on the first top surface portion 485 of the optical member 406. Furthermore, the optical fiber triangular bar 470 receives the light from the optical member 406 through the inclined surface 462, totally refracts the light in the optical fiber 471, and thus the light is finally displayed on the second top surface portion 464.

Thus, by forming the chamfer portion 460 between the neighboring optical members 406 touching each other, and connecting the first top surface portions 485 of the neighboring optical members 406 using the second top surface portion 464 of the optical fiber triangular bar 470, an image disconnection phenomenon at the non-display region NA can be reduced.

The optical fiber 499 of the optical member 406 includes a core portion located at a center and a cladding portion surrounding the core. The core has a refractive index greater than that of the cladding portion, thus a light input through the input portion 430 is totally refracted in the transmission portion 431 and transferred to the output portion 432.

To do this, the input portion 430 and the output portion 432 are not aligned in a line. The input portions 430 are located corresponding to the pixel regions P0 to P5 at the periphery of the display device 205 while the output portions 432 are located outer than the respective input portions 430. Accordingly, the optical fibers 499 have a refracted structure that inclines toward the non-display region NA.

The input portions 430 may have the same size, which corresponds to a size of each of the pixel regions P0 to P5. The output portion 432 may have a size equal to or greater than that of the input portion 430. According to a ratio of a size of the output portion 432 to a size of the input portion 430, an image enlarging ratio by the optical fiber 499 is decided.

Figure 5A:
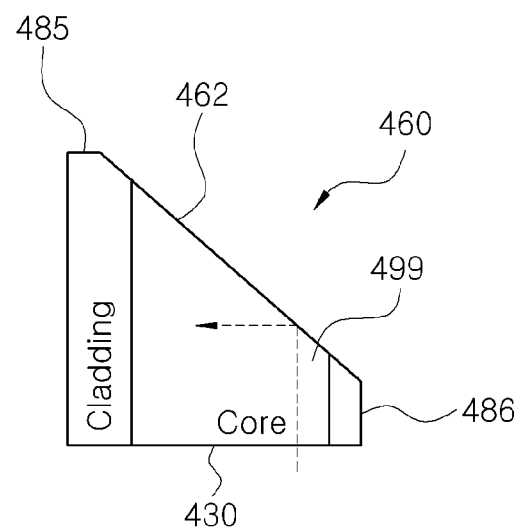
FIGS. 5A and 5B are views illustrating light paths according to the first embodiment.
Figure 5B:
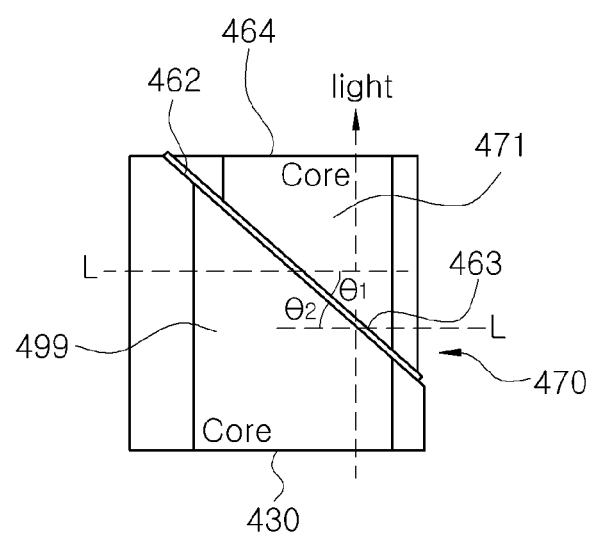

FIGS. 5A and 5B are views illustrating light paths according to the first embodiment.

Referring to FIG. 5A, in case that only the chamfer portion 460 is formed at the edge of the optical member 406, a light input from each of the pixel regions P0 to P5 to the input portion 430 of the optical fiber 499 is not output due to the chamfer surface 462 of the chamfer portion 460 of the output portion (432 of FIG. 4). This is because of a total reflection at the chamfer surface 462 of the output portion 432.

Referring to FIG. 5B, a light input from each of the pixel regions P0 to P5 to the input portion 430 of the optical fiber 499 is output to the second top surface portion 464 through the optical fiber 471 of the optical fiber triangular bar 470 which contacts and is joint to the chamfer surface 462. Accordingly, an image continuity can be obtained at the connection portion (201 of FIG. 4) of the multi-panel display device (200 of FIG. 3).

Regarding the optical path in FIG. 5B, an improved light transmission condition can be made when an angle θ2 between the chamfer surface 462 and a normal line L parallel with a light-incident surface is identical to an angle θ1 between the inclined surface 463 and the normal line L. In this case, the light from each of the pixel regions P0 to P5 passes through the chamfer surface 462 and the inclined surface touching each other and is output from the second top surface portion 464 without distortion or loss. Accordingly, an image continuity at the connection portion (201 of FIG. 4) can be achieved.

Furthermore, because of the optical fiber triangular bar 470, the crack of the neighboring optical members 406 due to a collision therebetween at the collision-expected portion (344 of FIG. 3) can be prevented.

Figure 6:
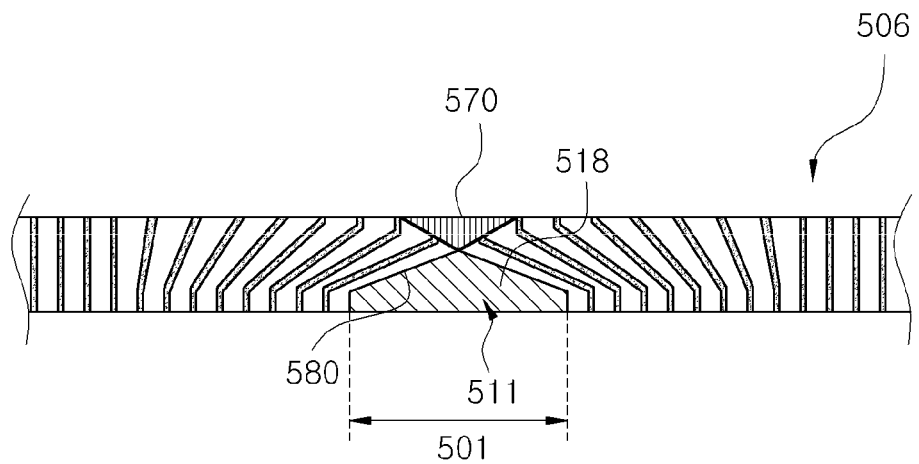
FIG. 6 is a cross-sectional view illustrating optical members with a resin filling a space between side surfaces of the optical members according to the first embodiment.

FIG. 6 is a cross-sectional view illustrating optical members with a resin filling a space between side surfaces of the optical members according to the first embodiment.

A space 511 which is located below a optical fiber triangular bar 570 and between side surfaces 580 of neighboring optical members 506 is filled with a resin 518.

In this case, a joint of the neighboring optical members 506 can be further strengthened at the connection portion 501 of the optical members 506, a convenience in mounting the optical member 506 to the multi-panel display device (200 of FIG. 3) can be provided, and a buffer effect happens thus a breakage due to a collision of the optical members 506 can be prevented.

The resin 518 may be made of a thermosetting resin or UV curable resin, and may be formed by filling the space 511 with the resin 518 and curing the resin 518 with heat or UV.

Figure 7:
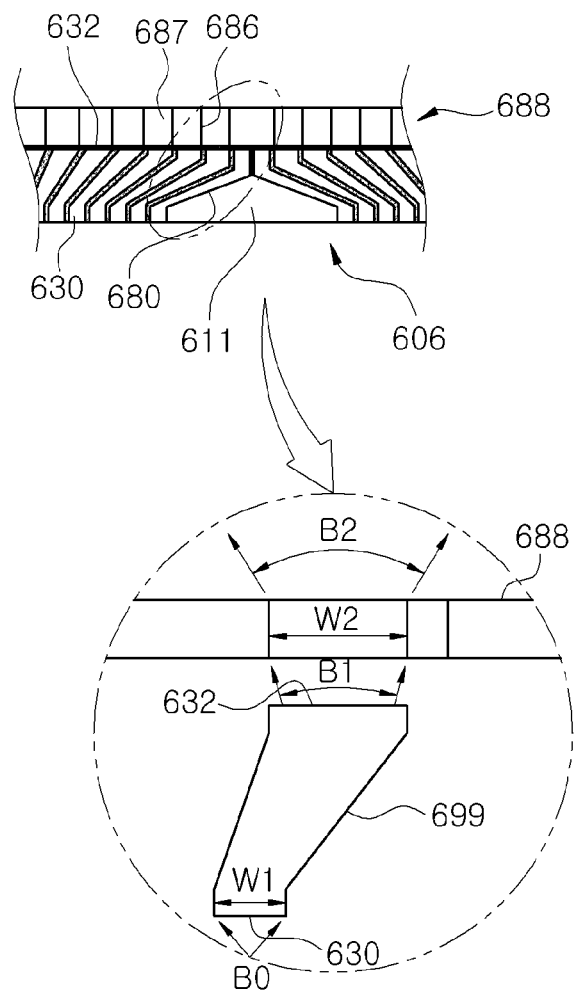
FIG. 7 is a cross-sectional view illustrating a portion of an optical member according to a second embodiment.

FIG. 7 is a cross-sectional view illustrating a portion of an optical member according to a second embodiment.

The multi-panel display device (200 of FIG. 3) of this embodiment may include an optical fiber plate 688 that is located on neighboring optical members 606 on neighboring display devices (205 of FIG. 4) to connect the neighboring optical members 606.

In this case, the optical members 606 and the optical fiber plate 688 may be integrated by interposing a resin therebetween.

The optical fiber plate 688 includes a plurality of straight line type optical fibers 687, and a support portion 686 supporting the optical fibers 687. A diameter W2 of the optical fiber 687 may be equal to or greater than a diameter W1 of an input portion 630 of an optical fiber 699 of the optical member 606.

Accordingly, even though a viewing angle B1 at an output portion 632 of the optical fiber 699 is relatively small, a final viewing angle B2 after passing through the optical fiber 687 of the optical fiber plate 688 can increase.

The optical fibers 687 and the support portion 686 are made of a transparent material. For example, poly-methyl methacrylate (PMMA), polycarbonate (PC), poly ether sulfone (PES), polypropylene (PP), methacrylate styrene (MS), polyethylene terephthalate (PET), acryl, silica, glass, or the like may be used.

In this embodiment, the optical fiber plate 688 connecting the optical members 606 is employed. Accordingly, the neighboring optical members 606 are integrated thus a convenience in mounting the optical member 606 to the multi-panel display device (200 of FIG. 3) can be provided, a wider viewing angle can be obtained, and a crack due to a collision of the optical members 606 can be prevented.

Further, like the first embodiment, a space between outer side surfaces 680 of the optical members 606 can be filled with a resin 611. Accordingly, a joint of the neighboring optical members 606 can be further strengthened at a connection portion of the optical members 606, and a buffer effect happens thus a reliability of the optical member 606 can be improved.

In the above embodiments, the entire-surface type optical member and the frame type optical members are described by way of example, and the present invention is not limited to such the types.

It will be apparent to those skilled in the art that various modifications and variation can be made to the present disclosure without departing from the spirit or scope of the disclosure. Thus, it is intended that the present invention cover the modifications and variations of this disclosure provided they come within the scope of the appended claims and their equivalents.

What is claimed is:

1. An optical member for a multi-panel display device, comprising:
    a first optical member located on a first display device and including optical fibers;
    a second optical member located on a second display device neighboring the first display device and including optical fibers; and
    an optical fiber triangular bar located to overlap a region where the first and second optical members are adjacent to each other, and including optical fibers,
    wherein each of the first and second optical members includes a chamfer portion corresponding to the optical fiber triangular bar at the region where the first and second optical members are adjacent to each other.

2. The optical member of claim 1, wherein each of the first and second optical members includes a resin support portion supporting the optical fibers thereof, and
    wherein the optical fibers of the optical fiber triangular bar are straight line type optical fibers, and the optical fiber triangular bar includes a resin support portion supporting the optical fibers of the optical fiber triangular bar.

3. The optical member of claim 1, wherein each of the first and second optical members includes:
    a first top surface portion,
    a bottom surface portion opposite to the first top surface portion, and
    side surfaces connecting the first top surface portion and the bottom surface portion,
    wherein the chamfer portion is located at a region between the first top surface portion and side surfaces, facing each other, of the first and second optical members.

4. The optical member of claim 3, wherein the optical fiber triangular bar includes:
    first and second inclined surfaces each corresponding to a chamfer surface of the chamfer portion of each of the first and second optical members, and
    a second top surface portion connecting the first and second inclined surfaces and parallel with the first top surface portion, and
    wherein a first angle between a normal line parallel with the first top surface portion and each of the first and second inclined surfaces is equal to a second angle between the normal line and the chamfer surface.

5. The optical member of claim 3, further comprising a resin located at a region between side surfaces, facing each other, of the first and second optical members.

6. The optical member of claim 3, wherein each of the first and second optical members is an entire-surface type optical member located corresponding to an entire surface of each of the first and second display devices, and includes:
    a first region corresponding to a center portion of each of the first and second display devices, and
    a second region corresponding to a non-display region of each of the first and second display devices,
    wherein the optical fibers of each of the first and second optical members include:
        a first optical fiber located at the first region, and
        a second optical fiber located at the second region and having a structure different from the first optical fiber,
        wherein the first optical fiber is a straight line type optical fiber that includes an input portion and an output portion having the same size, and the second optical fiber is a refracting type optical fiber that includes an input portion and an output portion having different sizes.

7. The optical member of claim 3, wherein each of the first and second optical members is a frame type optical member located corresponding to a peripheral portion of each of the first and second display devices, and includes:
    a transmissive center region corresponding to a center portion of each of the first and second display devices, and
    a frame portion surrounding the center region,
    wherein the frame portion includes an inner inclined side surface connecting the first top surface portion and the bottom surface portion.

8. A multi-panel display device, comprising:
    a first display device;
    a second display device neighboring the first display device;
    a first optical member located on the first display device and including optical fibers;
    a second optical member located on the second display device and including optical fibers; and
    an optical fiber triangular bar located to overlap a region where the first and second optical members are adjacent to each other, and including optical fibers,
    wherein each of the first and second optical members includes a chamfer portion corresponding to the optical fiber triangular bar at the region where the first and second optical members are adjacent to each other.

9. The device of claim 8, wherein each of the first and second optical members includes a resin support portion supporting the optical fibers thereof, and
    wherein the optical fibers of the optical fiber triangular bar are straight line type optical fibers, and the optical fiber triangular bar includes a resin support portion supporting the optical fibers of the optical fiber triangular bar.

10. The device of claim 8, wherein each of the first and second optical members includes:
    a first top surface portion,
    a bottom surface portion opposite to the first top surface portion, and
    side surfaces connecting the first top surface portion and the bottom surface portion,
    wherein the chamfer portion is located at a region between the first top surface portion and side surfaces, facing each other, of the first and second optical members.

11. The device of claim 10, wherein the optical fiber triangular bar includes:
    first and second inclined surfaces each corresponding to a chamfer surface of the chamfer portion of each of the first and second optical members, and
    a second top surface portion connecting the first and second inclined surfaces and parallel with the first top surface portion, and
    wherein a first angle between a normal line parallel with the first top surface portion and each of the first and second inclined surfaces is equal to a second angle between the normal line and the chamfer surface.

12. The device of claim 10, further comprising a resin located at a region between side surfaces, facing each other, of the first and second optical members.

13. The device of claim 10, wherein each of the first and second optical members is an entire-surface type optical member located corresponding to an entire surface of each of the first and second display devices, and includes:

a first region corresponding to a center portion of each of the first and second display devices, and a second region corresponding to a non-display region of each of the first and second display devices, wherein the optical fibers of each of the first and second optical members include a first optical fiber located at the first region, and a second optical fiber located at the second region and having a structure different from the first optical fiber, wherein the first optical fiber is a straight line type optical fiber that includes:

an input portion and an output portion having a same size, and the second optical fiber is a refracting type optical fiber that includes an input portion and an output portion having different sizes.

14. The device of claim 10, wherein each of the first and second optical members is a frame type optical member located corresponding to a peripheral portion of each of the first and second display devices, and includes:

a transmissive center region corresponding to a center portion of each of the first and second display devices, and a frame portion surrounding the center region, wherein the frame portion includes an inner inclined side surface connecting the first top surface portion and the bottom surface portion.

\* \* \* \* \*